United States Patent [19]

Orii

[11] Patent Number: 4,458,458
[45] Date of Patent: Jul. 10, 1984

[54] LINED TANK AND METHOD FOR FABRICATING THE SAME

[75] Inventor: Shoichi Orii, Kawasaki, Japan

[73] Assignee: Tokyo Shibaura Denki Kabushiki Kaisha, Kawasaki, Japan

[21] Appl. No.: 323,127

[22] Filed: Nov. 19, 1981

Related U.S. Application Data

[63] Continuation of Ser. No. 97,672, Nov. 27, 1979, abandoned, which is a continuation of Ser. No. 827,303, Aug. 24, 1977, abandoned.

[30] Foreign Application Priority Data

Aug. 24, 1976 [JP] Japan ............................... 51-100245

[51] Int. Cl.³ .............................................. G21C 7/00
[52] U.S. Cl. .................................. 52/173 R; 52/741; 52/606; 220/85 R; 376/295; 376/250
[58] Field of Search .................... 52/250, 169.6, 743, 52/173 R, 741, 606; 220/85 R, 460; 376/295, 250

[56] References Cited

U.S. PATENT DOCUMENTS

| 1,958,487 | 5/1934 | Moran | 52/169.6 |
|---|---|---|---|
| 2,460,054 | 1/1949 | Wiggins | 220/85 R X |
| 3,151,416 | 10/1964 | Eakin | 52/169.6 |
| 3,288,998 | 11/1966 | Dress | 250/336.1 |
| 3,339,783 | 9/1967 | Gorman | 220/901 X |
| 3,511,003 | 5/1970 | Alleaume | 220/460 X |

FOREIGN PATENT DOCUMENTS

50-36423 11/1975 Japan .
51-43605 11/1976 Japan .

Primary Examiner—John E. Murtagh
Assistant Examiner—Kathryn Ford
Attorney, Agent, or Firm—Stevens, Davis, Miller & Mosher

[57] ABSTRACT

A lined tank comprises a plurality of lining plates attached to the inside surface of the tank, concrete shutterings disposed inside of the lining plates and embedded in concrete, shaped steel members embedded in the concrete to which the shutterings are attached, backing plates attached to the embedded shaped steel members at the attached portions of the lining plates, leakage detecting channels which are defined by the above elements, and means connected to said leakage detecting channels and adapted to detect the leakage of the lined tank.

7 Claims, 13 Drawing Figures

LINED TANK AND METHOD FOR FABRICATING THE SAME

This is a continuation of application Ser. No. 97,672 filed Nov. 27, 1979 now abandoned which is a continuation of application Ser. No. 827,303 filed Aug. 24, 1977 now abandoned.

BACKGROUND OF THE INVENTION

This invention relates to a tank lined with a metal lining, such as a carbon steel plate lining or a stainless steel plate lining, and a method for fabricating the same.

Recently, the metal lining of a tank is widely utilized in nuclear plants and chemical plants, but in the following description a tank lined with stainless steel plates for storing radioactive waste in a nuclear power plant will be described as an example.

In a nuclear power plant, a tank lined with stainless steel plates has been used for storing radioactive waste from the plant to decay the radioactivity of the waste. However, in these days, the capacity of a nuclear power plant has been enlarged, but the size of a housing of a nuclear reactor is limited in view of an accident such as earthquake. Therefore, it has been necessary to provide a tank having such capacity as can effectively store the radioactive waste and to promptly detect leakage of the stored radioactive waste at high sensitivities.

Generally, a lined tank of the kind mentioned above has been fabricated in the following manner.

Shaped steel members to be embedded in concrete are arranged in lattice form on a primary concrete floor slab and a secondary concrete slab is then filled on the primary concrete slab so as not to bury the upper surfaces of the embedded shaped steel members thereby forming the bottom of a tank. An inside and an outside molding frames for a side wall are fabricated with a space therebetween, which is thereafter filled with concrete, to form a lowermost stage of the tank. Pile-up working for forming a second stage, a third stage, .... on the lowermost stage are made subsequently. After the setting of the concrete, the molding frames are removed and lining plates are welded to the exposed portions of the embedded shaped steel members.

In such fabrication method, since respective stages are not assembled initially, but the stage is piled up one by one as occasion demands, the connecting portions therebetween may not often be arranged precisely so that, unnecessary strain or deformation may be applied to the lining plates. To accurately assemble respective stages by this fabrication method, more work, much time and additional apparatus are required.

Furthermore, it is necessary to carefully consider the problem as to the leakage of the radioactive waste through the weld seams of the lining plates which are formed to fabricate and construct a tank for storing concrete, and if the radioactive waste leaks through the weld seams, it flows through the small hole of the backing plate into the space and then flows downwards the space, during which the leakage is detected.

However, in this prior art device for detecting the leakage through the tank, since the space is essentially a blind structure in spite of the presence of the small hole of the backing plate, an operator cannot inspect the state of the device before the welding of the lining plates.

SUMMARY OF THE INVENTION

Therefore, a primary object of the present invention is to provide an improved lined tank for storing a dangerous substance.

Another object of the present invention is to provide a method for fabricating the lined tank thereby removing the defects of the prior arts.

A further object of this invention is to provide a device for effectively detecting the leakage of the content in the lined tank.

According to the present invention, in one aspect, there is provided a lined tank which comprises a plurality of lining plates attached to the inside surface of the tank, concrete shutterings disposed inside of the lining plates and embedded in concrete, shaped steel members embedded in the concrete to which the shutterings are attached, backing plates attached to the embedded shaped steel member at the attached seams of said lining plates, leakage detecting channels which are defined by the lining plates, the shutterings, the embedded shaped steel members and the backing plates, and means connected to the leakage detecting channels for detecting the leakage of the tank.

Furthermore, according to the present invention, in the other aspect, there is provided a method for fabricating a lined tank in which a space between inside and outside molding frames of the tank is filled with concrete and after the setting thereof lining plates are attached to the concrete. The improvement of the method comprises the steps of forming a unit structure by concrete shutterings, backing plates, embedded shaped steel members, and leakage detecting channels defined by the above elements, securing the unit structure to the inside molding frame by a member for reinforcing the molding frame and a member for clamping the molding frame, interconnecting a plurality of the unit structures, connecting the unit structures to the outside molding frame by means of the clamping member, filling concrete into a space between the inside and outside molding frames of the tank, and attaching the lining plates to the inside wall of the tank after the concrete has been set.

BRIEF DESCRIPTION OF THE DRAWINGS

The other objects and advantages of the present invention will be more readily understood from the following description of preferred embodiments of the invention taken in conjunction with the accompanying drawings, in which.

DESCRIPTION OF THE PREFERRED EMBODIMENTS

Figure 1:
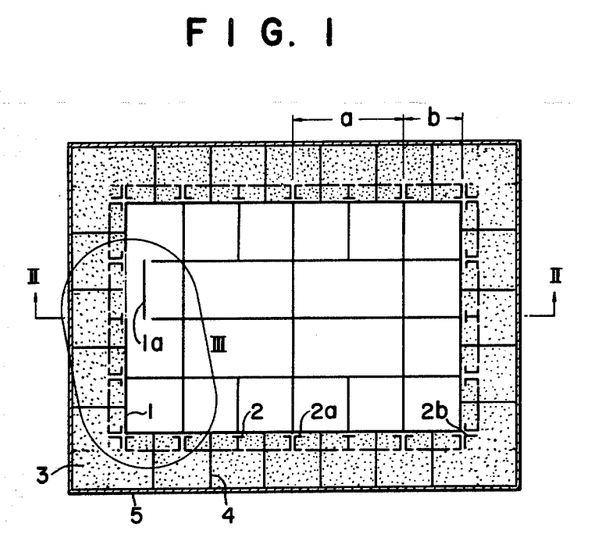
FIG. 1 is a cross-sectional view of one embodiment of a lined tank according to this invention.
Figure 2:
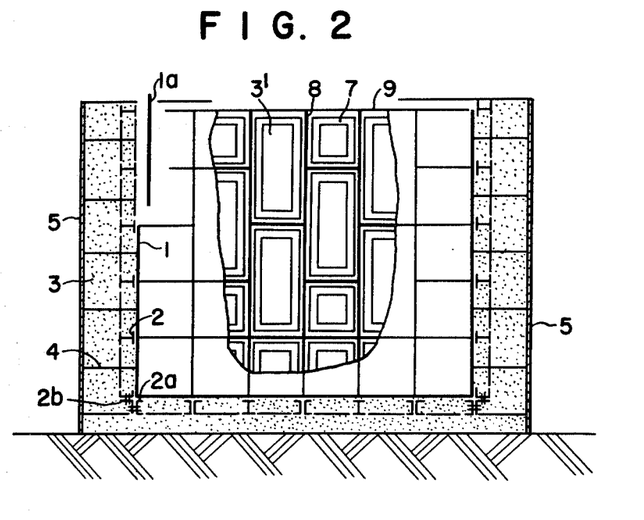
FIG. 2 is a cross-sectional view, partially broken away, showing the lined tank shown in FIG. 1 taken along the line II—II.

Referring to FIGS. 1 and 2, lining plates 1 are provided on the inside of a tank and are welded to standard shaped steel members 2 and 2a (for example, H-shaped steel stock, I-shaped steel stock, channel steel, angle steel, and the like) which are embedded in concrete 3 in spaced apart relationship. Angle steels 2b are also embedded in the concrete 3 at the corner portions of the tank and connected to the embedded shaped steel members 2a thereby reinforcing them. On the outside surface of the concrete 3, in which the shaped steel members 2, 2a and 2b are embedded, is provided an outer molding frame 5, and a plurality of tie bars 4 for clamping an inside molding frame 6 to the inside surface of the tank are provided in the concrete 3.

The inside surface of the tank to which the lining plates 1 are welded is formed by the shaped steel members 2, 2a, backing plates 8 secured to the shaped steel members, concrete shutterings or sheathings 7, leakage detecting channels 9 defined by the above elements, and the concrete 3. The concrete 3, the shutterings 7 and the tie bars 4 are arranged so that the inside surfaces thereof are all on the same plane.

Figure 3A:
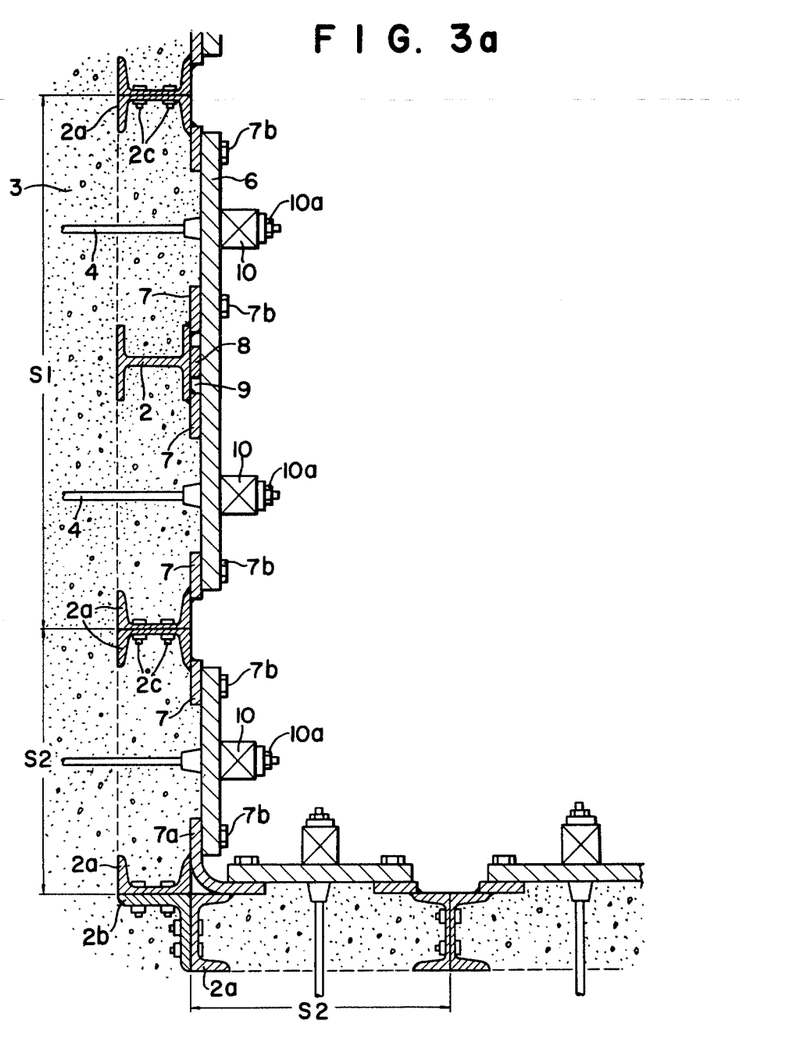
FIG. 3a and FIG. 3b are detailed cross-sectional views of the portion III of FIG. 1, showing successive steps of fabricating the tank.
Figure 3B:
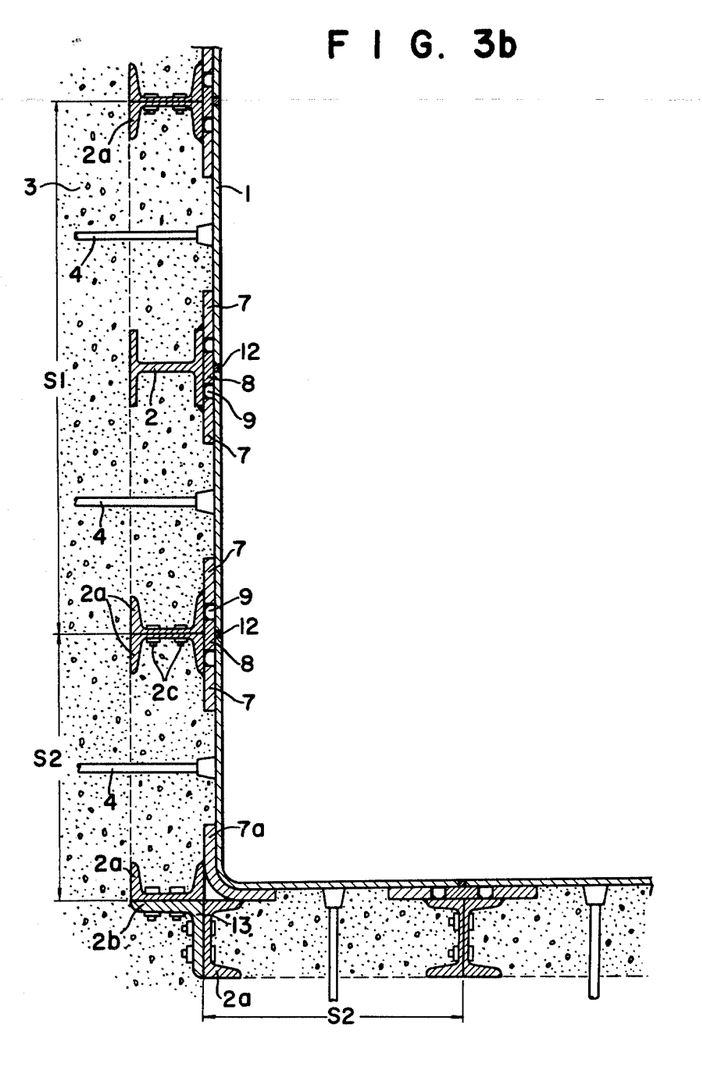
Figure 4:
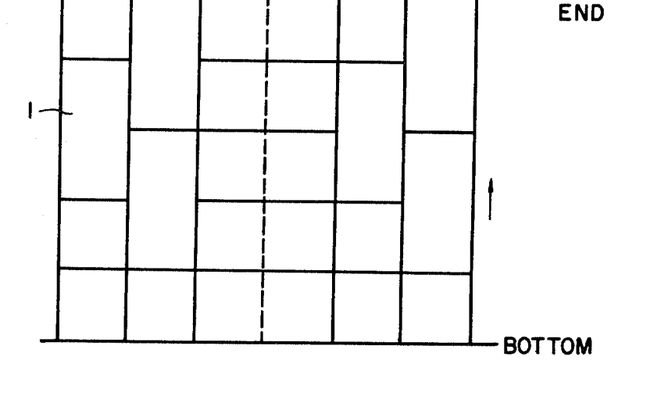
FIG. 4 shows an arrangement of lining plates.

Referring to FIGS. 3a, 3b and 4, in which the same reference numerals are applied to the same elements as used in FIGS. 1 and 2.

First, as shown in FIG. 4, the arrangement of the lining plates 1 is determined so that the weld seams between the plates (shown by solid lines) will not be positioned and not cross each other at the corner portions of the tank (shown by dotted line) and that the longitudinally central portion of the standard steel plates may be positioned at the corner portions and the weld seams will stagger with each other such like piled up bricks. Such arrangement is applied to the all corner portions of the side walls of the tank and between the side wall and the bottom surface of the tank.

After determining the arrangement of the lining plates, it will be necessary to consider a unit structure of the embedded shaped steel members, and concerning the corner portions of the tank, two plates intersecting at right angles should be considered independently, but as to the other portions of the tank, the unit structure is assumed to have twice length in transverse direction of the former unit structure (in this case, the welded portion must also be considered). Spans $S_2$ and $S_1$ in FIG. 4 correspond to the unit structures mentioned above, respectively.

Where the unit structure has span $S_1$, the shaped steel members 2a are arranged at both ends thereof. In the illustrated embodiment there is used a H-shaped steel stock 2 as the shaped steel member to be embedded, but a standard shaped steel member such as an angle steel, I-shaped steel and the like may of course be used. One concrete shutterings 7 is fixed to each shaped steel member 2a located at both ends of the unit structure $S_1$ and two shutterings 7 are fixed to the shaped steel member 2 at the central portion. The backing plate 8 is provided with spaces between it and two concrete shutterings 7 welded to the H-shaped steel 2 and these spaces are used as the channels for detecting leakage. The molding frame 6 is attached to the shutterings 7 and the backing plate 8 by means of bolts threaded into the shutterings 7, and the molding frame 6 is also clamped by the tie bars 4 and a bolt 10a extending through a reinforcing member 10 for the molding frame at the middle portion of the embedded shaped steel members 2 and 2a. Thus, the unit structure having span $S_1$ is obtained.

Regarding the other unit structure having span $S_2$, the shaped steel members 2a are arranged at right angles at the corner portions, and corner shaped steel members 2b are provided for reinforcing the shaped steel members 2a. The shaped steel members 2a are also embedded at the end portions of the unit structures having span $S_2$ and interconnected at right angles. As the shaped steel members 2a at the corner portions and the end portions, channel steels are used and as the corner shaped steel members 2b, angle steels are used, but the other standard shaped steel members or the combination thereof may of course be used. The concrete shutterings 7 are fixed to the end shaped steel members 2a and the shuttering 7a bent at right angles with some radius of curvature is fixed to the corner shaped steel members 2a. A molding frame 6 is screwed to the shutterings 7 and 7a by bolts 7b on one inside surface of the tank and another molding frame 6 is also screwed to the shutterings 7 and 7a by bolts on the other surface perpendicular to the former surface, and the tie bar 4 is clamped by bolt 10a through the molding frame reinforcing member 10 at the middle portion of each of the frames 6. Thus, the unit structure having span $S_2$ is obtained.

The fabrication of the unit structures will be explained hereunder.

The bottom portion of the tank is formed by positioning the unit structure with spaces therebetween on the primary concrete floor slab and the side walls are constructed such that the molding frame 5 for the outside wall is provided on the outside periphery of the tank, and the unit structures are provided on the inside thereof. The interconnection of the unit structures is made by fixing together the embedded shaped steel members 2a of the end portions by bolts 2c, and the molding frames 5 and 6 are held with a predetermined distance by the tie bar 4 and supported firmly with each other. Additional reinforcement is provided by securing the reinforcing member 10 to the inside of the molding frame 6 by bolts 10a.

After the fabrication of the molding frames 5 and 6, the space therebetween is filled with concrete and left as it is till the concrete sets. This state is represented by Figure 3a. After the setting of the concrete, the inside molding frame 6 and the reinforcing member 10 are removed and the backing plate 8 is welded to the middle portion of two concrete shutterings 7 of the embedded shaped steel members 2a located at the connecting portions of the unit structures in a manner that the surface of the backing plate 8 will be on the same plane as the surfaces of the concrete 3 and the concrete shutterings 7. In this arrangement, the leakage detecting channels 9 defined by the embedded shaped steel members 2a, the shutterings 7 and the backing plate 8 can be inspected from the inside thereof. At the next stage, the lining plates 1 are welded such that the weld seams 12 of the plates are positioned at substantially the central portions of the backing plates 8, respectively. This state is represented by FIG. 3b.

Further, FIGS. 1 and 2 show the condition immediately before the last lining plate 1 is welded. After the welding of the lining plates, non-destructive inspection, pressure proof test and air-tightness test are performed for respective welded portions.

In the foregoings, the shaped steel members 2 and 2a are embedded in a vertically aligned relationship (i.e. with respect to the sides of the tank), but it may be possible to pile up the structures in two or three stages if the tank is very deep or any specific condition is imposed upon the size of the shaped steel members, and the same construction may of course be applicable to the bottom portion of the tank.

Generally, the lining plate 1, the backing plate 8 and the weld seam 12 are made of stainless steel, and the other elements of carbon steel.

Figure 5:
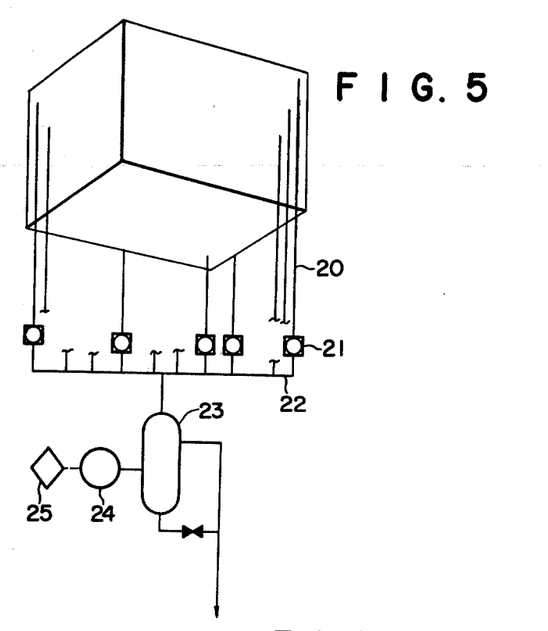
FIG. 5 is a diagramatic view of a device for detecting leakage according to this invention.

FIG. 5 is a diagramatic view of a device for detecting the leakage from the tank. The leakage detecting channels 9 shown in FIG. 2 are formed about the periphery thereof and channels for respective lining plates are independent from each other. The leakage can be detected by a conduit extending from the lowermost end of the channel 9. It may be possible to apply an agent (for example, paint) for preventing erosion of the surface of the concrete 3.

The leakage detecting channel 9 for each of the lining plates 1 is provided with a conduit 20 and a sight glass 21, respectively, and all the outlet ends of the sight glasses are commonly connected to a header 22 for detecting the leakage, the header 22 being connected to a drain pot 23. To the drain pot 23 there is connected a level switch 24, which is connected to an alarm 25. A conduit leading to a drain system of the plant is connected to the bottom of the drain pot 23 through a valve, and also connected to the upper portion of the drain pot 23.

The advantages, functions and effects according to the present invention superior to those of the prior arts will be summarized as follows.

Since the shaped steel members 2, 2a and 2b, the concrete shutterings 7 and 7a, and the backing plate 8 are welded together in factories and thus welded articles can be conveyed to a job field, the welding work in the factories can be made more precisely than made in the job field, thereby eliminating the welding work in the field and the time for the fabrication work can also be reduced. Therefore, the main work in the field is the fabrication of the unit structures of the shaped steel members which is generally be performed by bolt connection. The strength of the tank can be improved and the work efficiency as to the corner portions can be enhanced because of no existenc of the weld seam at the corner portions of the tank.

Furthermore, since the lining plates 1 are welded longitudinally in the vertical direction of the tank except the corner portions and periphery thereof, the welding work of the lining plates 1 in the field will easily be made. The lining plates 1 are not used as molding frames as in the prior arts, so that the damages of the surfaces of the lining plates 1 are substantially prevented to enhance the strength thereof, and the brick like piling arrangement of the lining plates reduces the number of crossing points of the weld seams thereby improving the mechanical strength thereof. Still furthermore, since the standard shaped steel members are utilized as shaped steel members to be embedded, and since the lining plates are fabricated by interconnecting the standard steel plates each having a predetermined size, works to be done for the lining plates are very simple, such as a drilling work, and can be performed in a short time and the quality and the performance of the lined tank are also improved, which leads to low work cost and mass production. The lining plates can be attached during the fabrication of the upper floors of the plant, which is apparently advantageous for the fabrication work. The provision of the molding frame reinforcing members increases the strength of the tank against the pressure applied thereto during the filling of the concrete and economically eliminates the necessity for thickening the molding frame. Thus, the welded portions can advantageously be checked.

Concerning the leakage detecting device, if the content in the lined tank leaks through the welded portions of the lining plates, the leaked content flows into the leakage detection channels 9 and thereafter passes the sight glass 21 through the conduit 20. The sight glass 21 detects a particular block in which the leakage has occured. The leaked content flows downwardly into the drain pot 23 and raises the level of the leaked content flown thereinto. When the level switch 24, for example, in the form of a float switch; detects the rise of the leaked content in the drain pot 23, the alarm 25 is operated, whereby the leakage can be detected even if the monitoring is not always made. After the alarming, the leaking block can be detected by inspecting the sight glasses 21.

Each leakage detecting channel 9 is defined by the shaped steel members 2 or 2a, the backing plate 8 and the shutterings 7, and before the welding of the lining plates 1 it can be confirmed whether the channel 9 is in good operative condition or not. Since the backing plate 8 and the concrete shutterings 7 have simple constructions, the corner portion of the channel 9 can easily be formed. Furthermore, in the filling of the concrete, the channels 9 are completely separated from the concrete by the shutterings and are not clogged with the concrete, and even if the channels 9 were clogged, the checking of the channels 9 can effectively be made and the clogged concrete can also easily be removed. Leakage test for the weld seams of the lining plates 1 can be performed by applying back pressure to the weld seams through channel 9.

Figure 6:
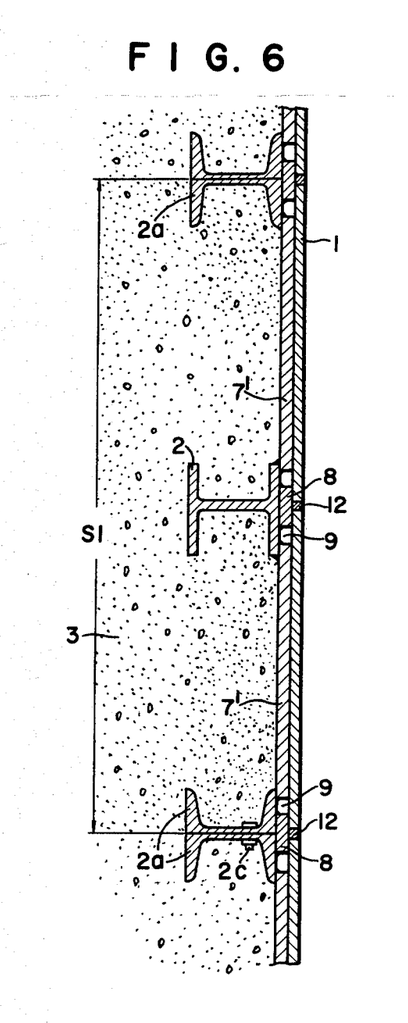
FIG. 6 and FIG. 7 show cross-sectional views of the other embodiments of the lined tank according to this invention.

FIG. 6 shows another embodiment of the lined tank according to the present invention, in which the same reference numerals are applied to the same elements as used in FIGS. 1 through 5.

In this embodiment, concrete shutterings 7' are connected and fixed to the adjacent embedded shaped steel members 2 and 2a. This construction eliminates the use of the molding frame 6 which was used in the above-mentioned embodiment, and after the filling of the concrete, the lining plate 1 may be further welded to form a doubly lined tank thereby improving the accuracy thereof and enabling to detect the leakage from the other portion of the weld seams.

Figure 7:
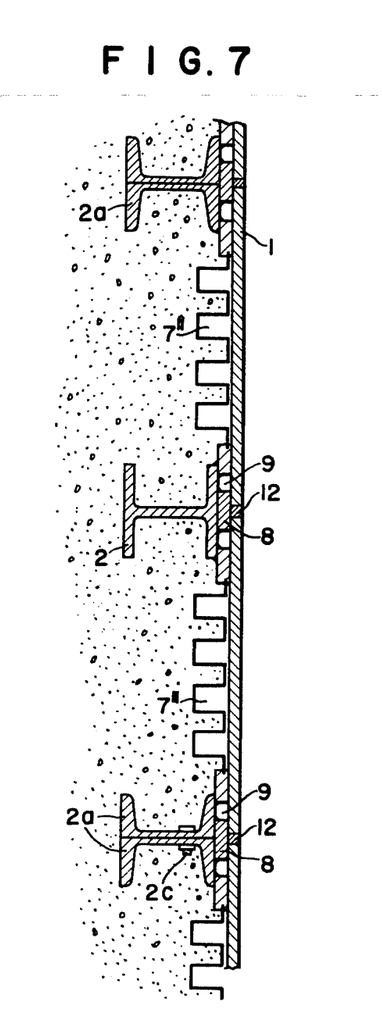

FIG. 7 shows a further embodiment of the lined tank of this invention, in which the same reference numerals are applied to the same elements as used in FIGS. 1 through 5.

In this embodiment, concrete shutterings 7" comprise waved iron plates (deck plates) secured to the adjacent embedded shaped steel members 2 and 2a. This construction can resist against the pressure created in the filling of the concrete and the lined tank can be constructed precisely. Furthermore, the lined tank of FIG. 7 is lighter than that of FIG. 6 and the accuracy of the lined tank is also improved because of the doubly lined structure. The leakage from the other portion of the weld seams can also be detected.

Figure 10:
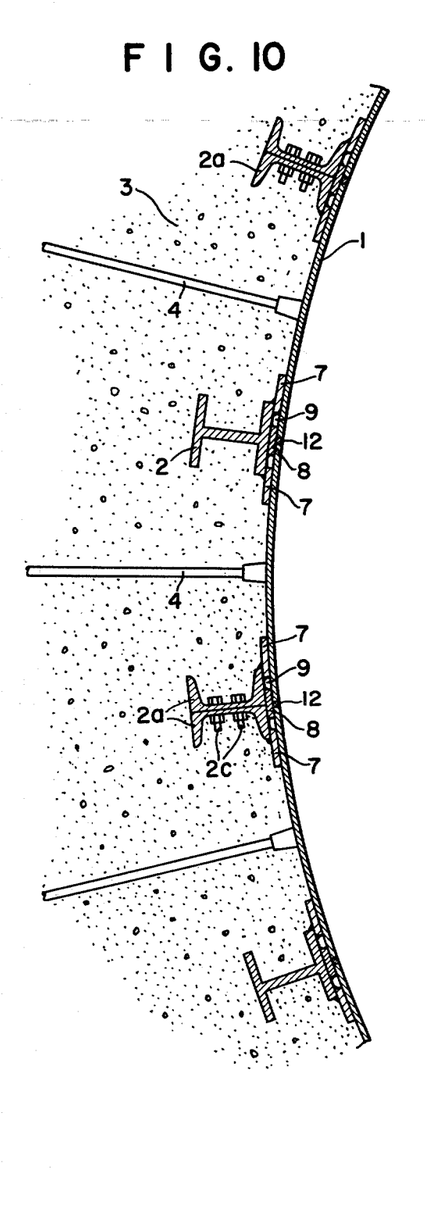
FIG. 10 is a cross-sectional view of a further embodiment of the lined tank.

In the foregoing embodiments, a lined tank having rectangular cross-section was referred to, but tanks having cylindrical or spherical cross-section may also be fabricated. FIG. 10 shows an embodiment of the lined tank having cylindrical cross-section, in which backing plates 8 are applied to the portions of the weld seams 12 of a plurality of lining plates 1 each having a curved surface, and leakage detecting channels 9 are defined on both sides of the backing plate 8 by the embedded shaped steel members 2a, the backing plate 8, the shutterings 7 and the lining plate 1. Shaped steel members 2 and 2a are embedded in the concrete 3, and the tie bars 4 for clamping the molding frames 6 are provided between the shaped steel members 2 and 2a. The lining plates 1, the backing plates 8 and the weld seams 12 are usually made of stainless steel and the other elements are of carbon steel. It is of course well known that the strength of the lined tank can be increased by forming it as a cylindrical or spherical structure.

Figure 11:
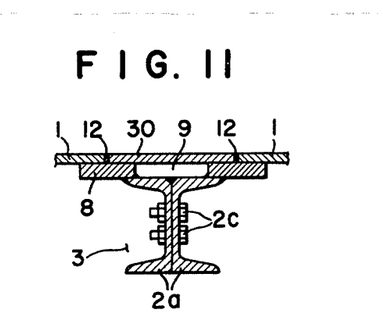
FIG. 11 and FIG. 12 show cross-sectional views of the other embodiments of the leakage detecting channels.

FIG. 11 shows another embodiment of the channel for detecting leakage from the lined tank according to the present invention, in which the respective lining plates 1 are welded together through narrow lining plates 30 and to each of the weld seams 12, a backing plate 8 is applied. The backing plate 8 is embedded in the concrete 3 and welded to the shaped steel members 2a screwed by bolts 2c. The channel 9 for detecting leakage is defined by the narrow lining plate 30, the backing plate 8 and the embedded shaped steel members 2a.

Figure 12:
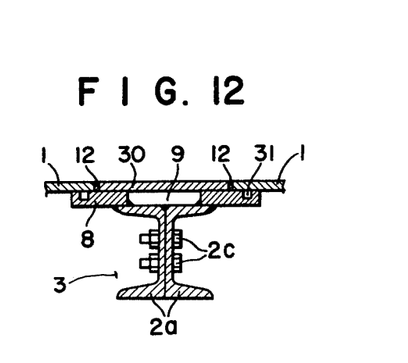

As shown in FIG. 12, leakage channels 31 may also be provided for the backing plates 8 on the opposite sides of the channel 9 with respect to the weld seams 12, and the channels 31 are communicated with the leakage detecting channel 9 at optional portions. With this construction, it is possible to extend one of the lining plates so as to cover the channel 9 without using the narrow lining plate 30. Thus the number of weld seams 12 is reduced to one.

Figure 8:
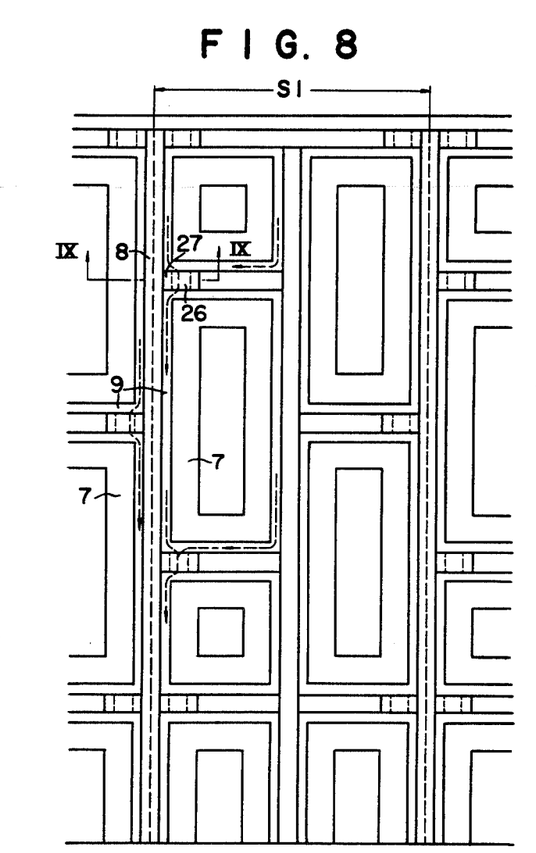
FIG. 8 is a front view showing a modified embodiment of leakage detecting channels of the invention.
Figure 9:
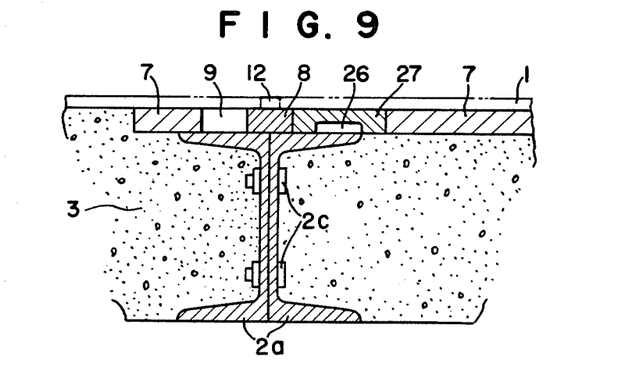
FIG. 9 is a cross-sectional view of the channels shown in FIG. 8 taken along the line IX—IX.

FIG. 8 shows a further embodiment of the leakage detecting channels of the lined tank according to the present invention and FIG. 9 is a cross sectional view taken along the line IX—IX of FIG. 8, in which the same reference numerals are applied to the same elements as used in FIGS. 1 through 7.

In the foregoing embodiment of FIGS. 1 through 5, one conduit 20 and one sight glass 21 are provided for each lining plate 1, but in the embodiment of FIG. 8, the leakage detecting channels 9 of the respective unit structures are communicated with each other by a backing plate adjusting member 27 provided with a communication channel 26, and to the channel 9 of the lowermost unit structure a conduit is connected. The sight glass 21 is further connected to the conduit 20.

In this embodiment, as mentioned above, the flow of the leaked content is shown by dotted line in FIG. 8 and the weld seams alligned in the vertical direction can be inspected by one device for detecting the leakage, and accordingly, the number of the devices to be used can be reduced. The provision of the number 27 for adjusting the backing plates 8 enables the adjustment of the vertical and horizontal gaps, such adjustments being difficult where the backing plate 8 is welded in the job field. The member 27 has a small size and is easily worked and one or a plurality of members 27 may be disposed at the bottom of each unit structure.

As mentioned above, according to the present invention, there is provided an improved lined tank by a method for precisely fabricating the same and the processes for the fabrication can be shortened. Furthermore, the lined tank is provided with a device for promptly detecting the leakage.

Further, although foregoing description was made in connection with a lined tank and the fabrication method thereof, it should be understood that various modifications and changes are obvious to one skilled in the art and that the lined tank of this invention can also be used for a nuclear power plant and/or chemical plant.

I claim:

1. A lined tank made of concrete comprising:
a plurality of lining plates forming an interior surface of said tank;
a plurality of concrete shutterings embedded in concrete welded to said lining plates for supporting said linings;
a plurality of steel members embedded in said concrete welded to support said concrete shutterings;
a plurality of backing plates adjacent said shutterings and spaced apart therefrom; said backing plates, concrete shutterings and steel members forming a plurality of leakage detecting channels so as to detect leakage from the tank at portions where said lining plates are welded to said backing plates, each of said leakage detecting channels extending along the periphery of a respective backing plate to form an independent leakage detecting channel for each of said plates.

2. The lined tank according to claim 1, wherein each of said concrete shutterings comprises a flat plate having ends which are attached to the adjacent embedded shaped steel members.

3. The lined tank according to claim 1, wherein each of said concrete shutterings comprises a waved steel plate having ends which are attached to the adjacent embedded shaped steel members.

4. The lined tank of claim 1, further comprising a plurality of conduits, each of said conduits connecting a respective leakage detecting channel with a communication channel common to all of the conduits.

5. In a method for fabricating a lined tank in which a space between inside and outside molding frames of the tank is filled with concrete and after the setting thereof lining plates are attached to the concrete; the improvement which comprises the steps of forming a unit structure by elements comprising concrete shutterings, backing plates, embedded shaped steel members and a plurality of leakage detecting channels defined by said elements, each of said leakage detecting channels extending along the periphery of a respective backing plate to form an independent leakage detecting channel for each of said plates; securing said unit structure to the inside molding frame by a member for reinforcing the molding frame and a member for clamping said molding frame; interconnecting a plurality of said unit structures; connecting said unit structures to the outside molding frame by means of said clamping member; filling concrete into a space between said inside and outside molding frames of the tank; and attaching said lining plates to the inside wall of the tank after the concrete has set.

6. The method according to claim 5, wherein said unit structures are arranged in a tank having corner portions so that when said lining plates are attached, only the longitudinally central portions of the lining plates are placed in the corner portions of the tank, whereby the attached portions of the lining plates are not positioned in the vertical direction in the corner portions of the tank.

7. The method according to claim 5, wherein said unit structures are disposed at right angles at the bottom corners of said tank and at least one unit structure having a larger span than those of the unit structures at the bottom corners and are interposed therebetween with spaced relationship, and said lining plate is connected to said unit structures through said backing plate.

* * * * *